United States Patent
Fringeli et al.

(10) Patent No.: US 6,891,113 B2
(45) Date of Patent: May 10, 2005

(54) BALANCE WITH CABLE STORAGE COMPARTMENT

(75) Inventors: Eduard Fringeli, Bubikon (CH); Paul Lüchinger, Uster (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/673,315

(22) Filed: Sep. 29, 2003

(65) Prior Publication Data

US 2004/0118620 A1 Jun. 24, 2004

Related U.S. Application Data

(63) Continuation of application No. PCT/IB02/00812, filed on Mar. 20, 2002.

(30) Foreign Application Priority Data

Mar. 29, 2001 (DE) .......................................... 101 15 788

(51) Int. Cl.[7] .............................................. G01G 21/28
(52) U.S. Cl. ...................................................... 177/238
(58) Field of Search ................................. 177/180–181, 177/238–244

(56) References Cited

U.S. PATENT DOCUMENTS

| 4,632,199 | A | * | 12/1986 | Ober et al. ................. 177/238 |
| 4,979,579 | A | * | 12/1990 | Dardat et al. ................ 177/180 |
| 5,094,396 | A | * | 3/1992 | Burke ....................... 242/378.2 |
| 5,175,398 | A | | 12/1992 | Hoffmann .................... 174/169 |
| 5,241,593 | A | * | 8/1993 | Wagner ....................... 379/438 |
| 6,088,021 | A | * | 7/2000 | Yong ........................... 345/163 |
| 6,472,617 | B1 | * | 10/2002 | Montagnino ................. 177/126 |
| 6,531,665 | B2 | * | 3/2003 | Gietenbruch et al. ........ 177/126 |
| 6,633,007 | B1 | * | 10/2003 | Lüchinger et al. .......... 177/126 |

FOREIGN PATENT DOCUMENTS

| DE | 78 13 781 U1 | * | 8/1978 |
| DE | 84 01 333 U1 | * | 1/1984 |
| JP | 59133179 | | 7/1984 |

* cited by examiner

Primary Examiner—Randy W. Gibson
(74) Attorney, Agent, or Firm—Standley Law Group LLP

(57) ABSTRACT

A balance is connectable to a display/operating unit (13) through a cable (14). The display/operating unit (13) can be placed either adjacent to the housing (1) or at a distance from the housing (1). For storing the unused length of cable (14), a corridor compartment (24) with at least one exit opening (22, 29, 30) for the cable (14) is arranged at the bottom (6) of the balance housing (1). When the cable (14) is pulled out or pushed in, it can move freely inside the corridor compartment (24). The display/operating unit (13) is held in place at the balance housing (1) by means of an intermediate member (10) in an arrangement where the balance and the display/operating unit are resting independently of each other on a supporting surface.

20 Claims, 7 Drawing Sheets

BALANCE WITH CABLE STORAGE COMPARTMENT

This application is a Continuation of prior application No.: PCT/IB02/00812 filed Mar. 20, 2002.

BACKGROUND OF THE INVENTION

The invention relates to a balance with a housing that is closed off from below by a bottom portion. The balance also includes a display/operating unit configured to be connected to the balance through one or more cables, so that the display/operating unit can be placed either adjacent to the housing or at a distance from the housing.

Balances with display/operating units that can be placed separately from the balance are in wide use, because they offer a high degree of flexibility with regard to their set-up configuration. In particular instances, the display/operating unit can be placed close to the balance and also remote from the balance, mostly in a configuration where the balance and the display/operating unit are connected through a cable for the transmission of electrical signals. It is desirable to always adjust the free cable length to the required distance. The cables are therefore often attached to the bottom of the balance, held on a cable reel or in a guide and storage channel, which requires that the balance be turned upside down or at least lifted up for winding and unwinding the cable.

A person-weighing scale is described in DE 31 01 224 A1, where the display/operating unit can be set up separately from the scale, for example attached to a wall. The display/operating unit has a battery compartment. Between the battery compartment and the outside wall of the housing, there is a free space in which the connecting cable can be stored when the scale is not in use.

The German patent application DE 198 58 625 A1 discloses a balance with a display/operating console that can be set at an adjustable tilt angle relative to the balance housing as well as removed from the balance housing, where the bottom portion of the display/operating console contains a hollow space where the cable can be wound up. The hollow space is covered from below by a bottom cover panel. To adjust the cable length in accordance with the desired distance between the balance and the display/operating console, one only has to tilt the display/operating panel into a vertical position, remove the bottom panel and wind or unwind the required length of cable.

The state-of-the-art balances of the foregoing description have the disadvantage that every time the equipment is rearranged or relocated, a certain amount of manipulation is required in order to adjust the connecting cable as needed. This may include tilting or lifting the balance which can have an unfavorable effect on the stability, or it may require unscrewing a bottom panel covering the cable-storage space, and either winding or unwinding the cable.

OBJECT AND SUMMARY OF THE INVENTION

The present invention therefore has the objective to provide an arrangement that allows the position or place of the display/operating unit to be changed without having to perform further manipulations in the balance or its display/operating unit.

A balance which meets the foregoing objective in accordance with the invention has a housing that includes a bottom portion, and it further has a display/operating unit that is connected to the balance through at least one cable. The display/operating unit can be placed at the housing as well as remote from the housing. A corridor compartment is arranged at the bottom of the housing for storing the unused length of the at least one cable. The corridor has at least one exit opening for the passage of the cable, and the cable is freely movable inside the corridor by pulling or pushing on the cable from the outside.

This balance has the special advantage, that the aforementioned process of relocating the display/operating unit can be performed with one hand. This applies to moving the display/operating unit closer to as well as farther away from the balance housing. Since the balance does not have to be moved in this process, the stability of the balance is maintained. Any desired distance between the display/operating unit and the balance housing can be accommodated without a loose length of cable cluttering up the workplace.

For example, if any of the material being weighed has been spilled, the work surface can easily be cleaned by lifting the display/operating unit with one hand. As a further advantage, the display/operating unit can be separated from the balance housing and thus can be packaged inside a more favorable volume for transportation.

In a preferred embodiment of the present invention, the cable storage corridor is integrated in the bottom compartment. The corridor compartment preferably contains cable guide elements configured as curved guide walls which are integrated in the corridor, particularly in a hook-shaped, U-shaped, or S-shaped configuration. The cable can be connected through a plug-in connector to the weighing cell circuit inside the balance.

In a particularly preferred embodiment, the display/operating unit is held on the housing by means of an intermediate member, which is configured to plug into the housing or into the display/operating unit. With this arrangement, the balance can be lifted up together with the display/operating unit for the cleaning of the work surface or to easily transport the balance to another workstation.

The intermediate member has a flat portion on which information may be printed or affixed. Alternatively, an emitter/receiver unit could be attached to the intermediate member for a signal transmission to and from another emitter/receiver unit that may for example be attached to a display/operating unit. This concept provides a maximum amount of flexibility in arranging the display/operating unit and proves to be of particular advantage if the balance is used in a protected setting, for example inside a glove box, in which case the display/operating unit can be placed on the outside.

In another embodiment, the cable corridor has at least one cable exit on each of two or more different sides of the balance. As another possibility, the cable corridor can be designed to accommodate two or more cables, which can be pulled out or pushed back through different exit openings. The cable corridor is closed off at the bottom by a cover plate.

In a particularly advantageous embodiment of the invention, the at least one cable has a cable plug at the cable end that connects to the display/operating unit. The receptacle for the plug is arranged in the display/operating unit, and the tilt angle of the display is adjustable. It is also possible to have a plurality of display/operating units connected to the balance.

BRIEF DESCRIPTION OF THE DRAWINGS

Further details of the invention will become apparent from an embodiment that is described below based on the drawings which schematically illustrate possibilities to execute the inventive concept, and wherein.

DETAILED DESCRIPTION OF PREFERRED EMBODIMENTS

Figure 1:
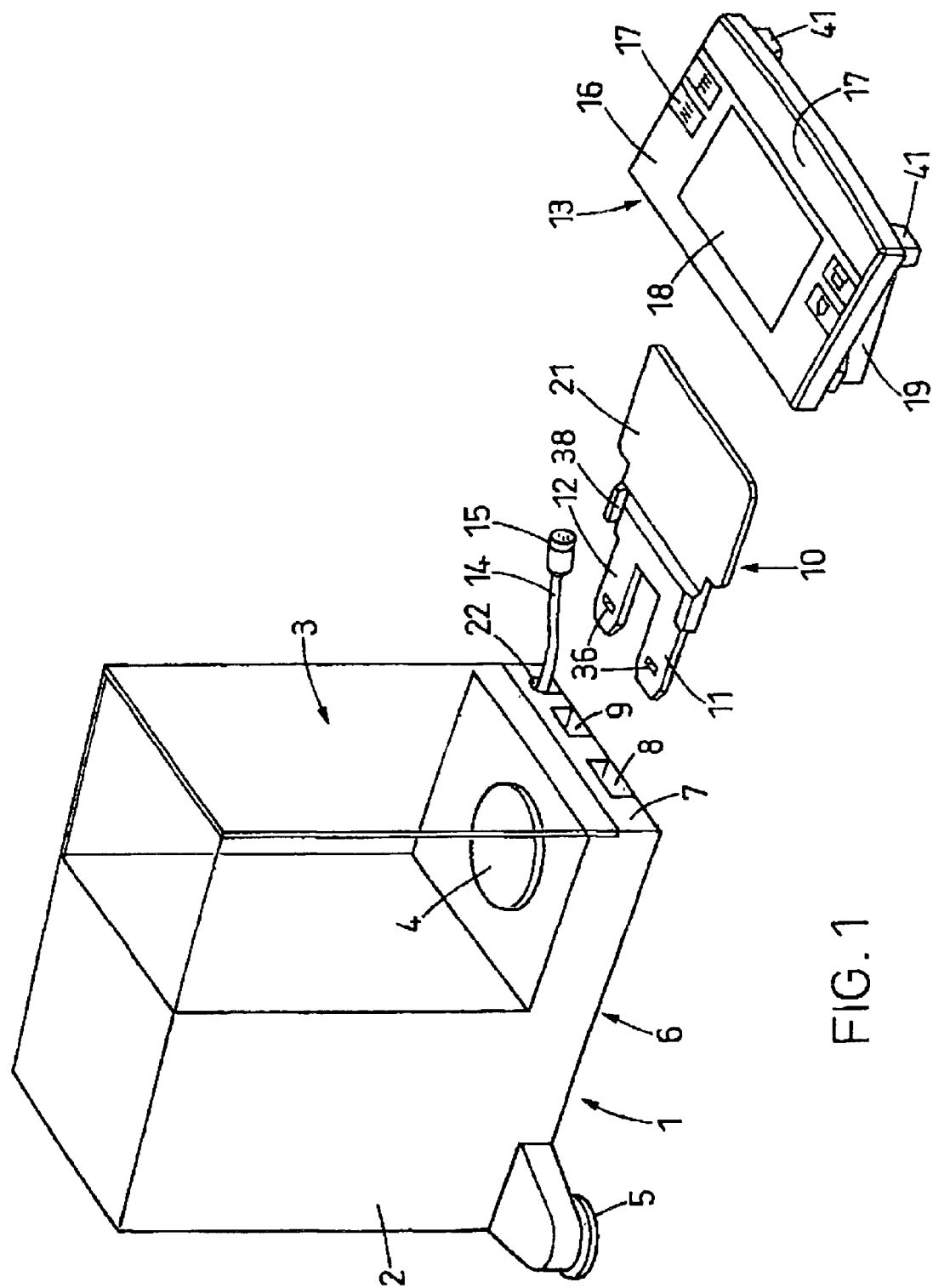
FIG. 1 represents a perspective view of the balance with the display/operating unit taken off.

FIG. 1 shows a perspective view of a balance that is surrounded by a housing 1 in a configuration that is used, e.g., in an analytical balance. Arranged in the rear portion 2 of the housing 1 are the weighing cell (not visible in the drawing) and the weighing cell electronics. The front portion of the housing 1 is taken up by the weighing compartment 3, which has movable window panels that can be opened and closed for placing the weighing samples on the weighing pan 4. The housing 1 is closed off from below by a bottom 6. The balance stands, e.g., on three feet 5, 5'. One of the feet 5 can be seen protruding from the side of the rear portion of the balance housing 1, preferably designed to be height-adjustable so that the balance can be put into a leveled position. Another foot 5, likewise height-adjustable for the leveling of the balance, is located on the opposite side of the rear portion of the balance and is not visible in FIG. 1. A third foot 5' (see FIG. 2) is arranged below the weighing compartment 3 on the bottom 6. The bottom 6 of the housing 1 is designed as a hollow space or compartment as will be described in further detail below in the context of FIGS. 2 and 4 to 7. At the front side 7 of the housing 1 are two openings 8, 9 of the bottom compartment, where an intermediate member 10 can be plugged in by means of two flat prongs 11, 12. The intermediate member 10 serves to hold a display/operating unit 13 which can be placed directly up to the housing or also in a remote position from the housing. A connecting cable 14 with a plug 15, which provides the electrical connection between the weighing cell electronics inside the housing 1 and the display/operating unit 13, is seated in the groove 38 on the intermediate member 10.

The display/operating unit 13 is designed with a slanted panel surface 16 facing the operator and carrying operating keys 17 as well as a display field 18. The underside of the display/operating unit 13 is connected to a wedge-shaped base 19. The base 19 rests on two feet 41 arranged at the end facing the user and on at least two further support points arranged at the back end of the base 19, so that the base stands firmly on the work surface. The support points as well as the feet 41 can in addition be equipped with polymer pads to secure the display/operating unit 13 against sliding on the work surface.

Figure 2:
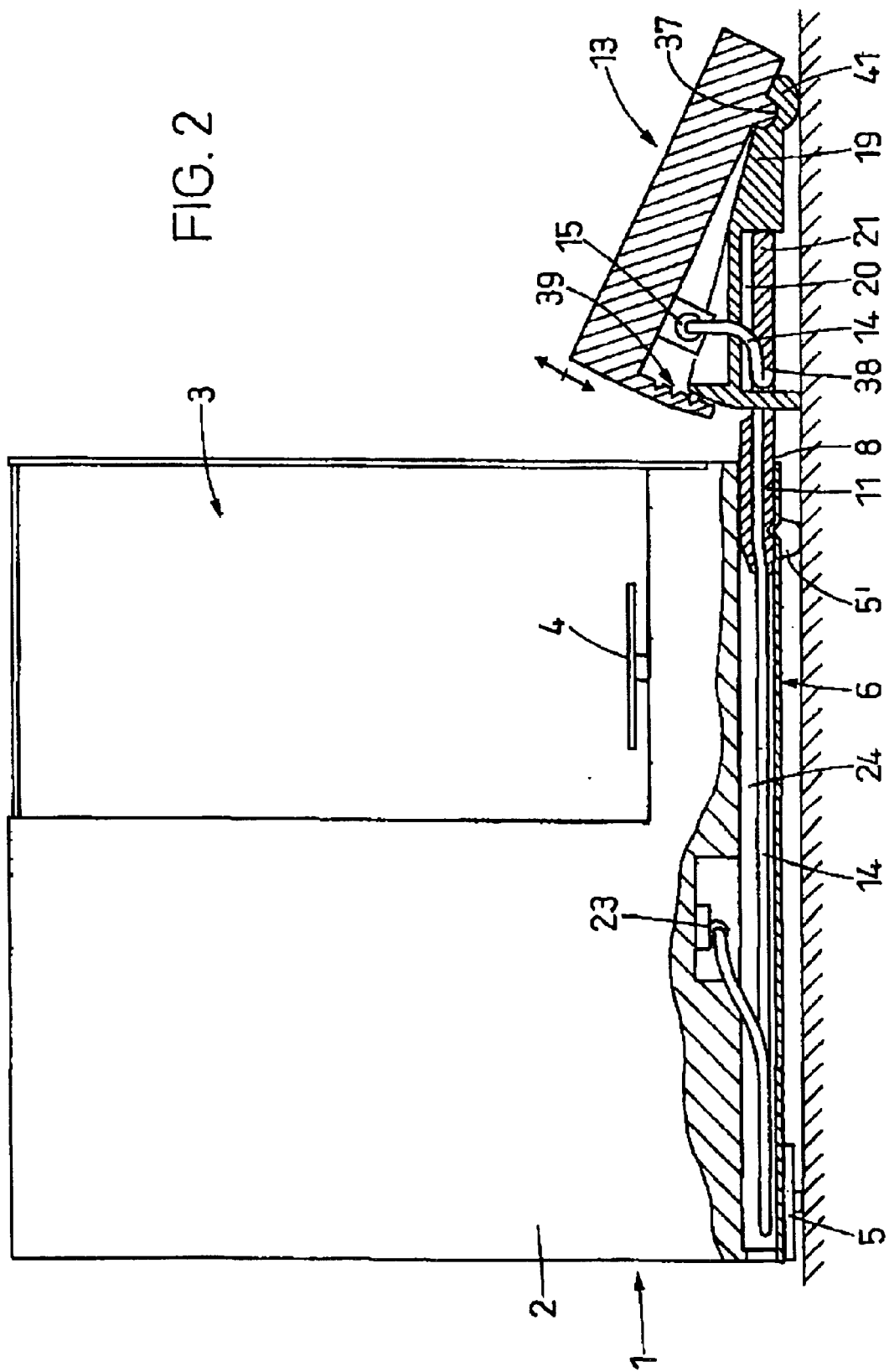
FIG. 2 represents a side view of the balance with portions cut away.

FIG. 2 shows the balance from the side in a partially sectional view. With its prongs 11 and 12, the intermediate member 10 is plugged into the openings 8, 9 of the compartment in the bottom 6. This is where the advantage of the two-part concept for the display/operating unit 13 becomes apparent. The base 19, which has an approximately H-shaped profile leaving an approximately rectangular clear space 20 at the underside, is resting firmly on the work surface. The flat portion 21 of the intermediate member 10 projects into the clear space 20, but leaves enough of a gap at the top and bottom to allow a slightly tilted position of the flat portion 21 in the clear space 20. Thus, the balance on the one hand and the display/operating unit 13 on the other can both be in stable contact with the work surface 13 independently of each other, even though they are connected, and the balance can be leveled without a change in the position of the display/operating unit 13.

The display/operating unit 13 has a hinge 37 located above the feet 41. The upper part of the display/operating unit 13 can be tilted on this hinge to adjust the slope angle. A detent mechanism 39 serves to lock the unit at the selected slope angle.

The cable 14, which is routed through the groove 38 into the space between the two parts of the display/operating unit 13, is plugged into a socket in the upper part of the display/operating unit 13 by means of the cable plug 15. The cable 14 is routed through a passage opening 22 (see FIG. 1) into the bottom space 6, which is configured as a corridor compartment 24 through which the cable continues to the cable end that connects to the balance. Another connector plug 23 at the end of the cable 14 that is inside the cable corridor establishes the connection to the electronics associated with the weighing cell (not shown in the drawing). The corridor 24 is preferably designed with a flat profile so that the height of the bottom portion 6 of the balance is not increased any more than necessary. The height of the corridor 24 is determined on the one hand by the thickness of the cable and on the other hand by the requirement that the cable 14 must not be allowed to bend in the vertical direction.

Figure 3:
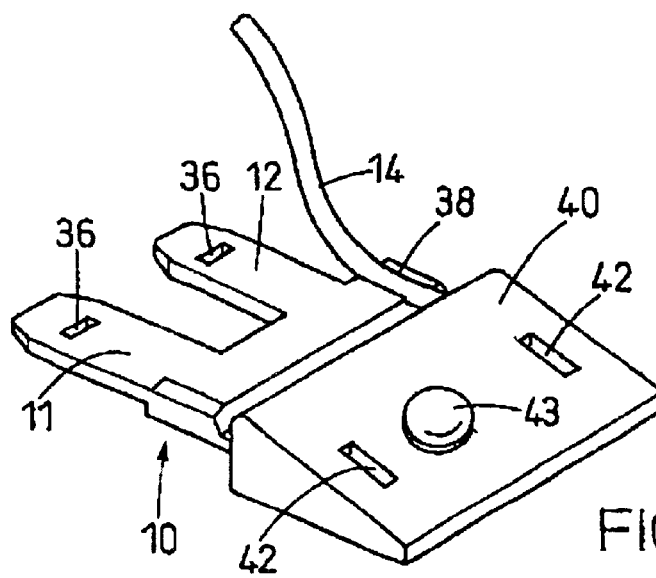
FIG. 3 represents an alternative design for connecting the display/operating unit to the balance by way of an intermediate member.
Figure 8:
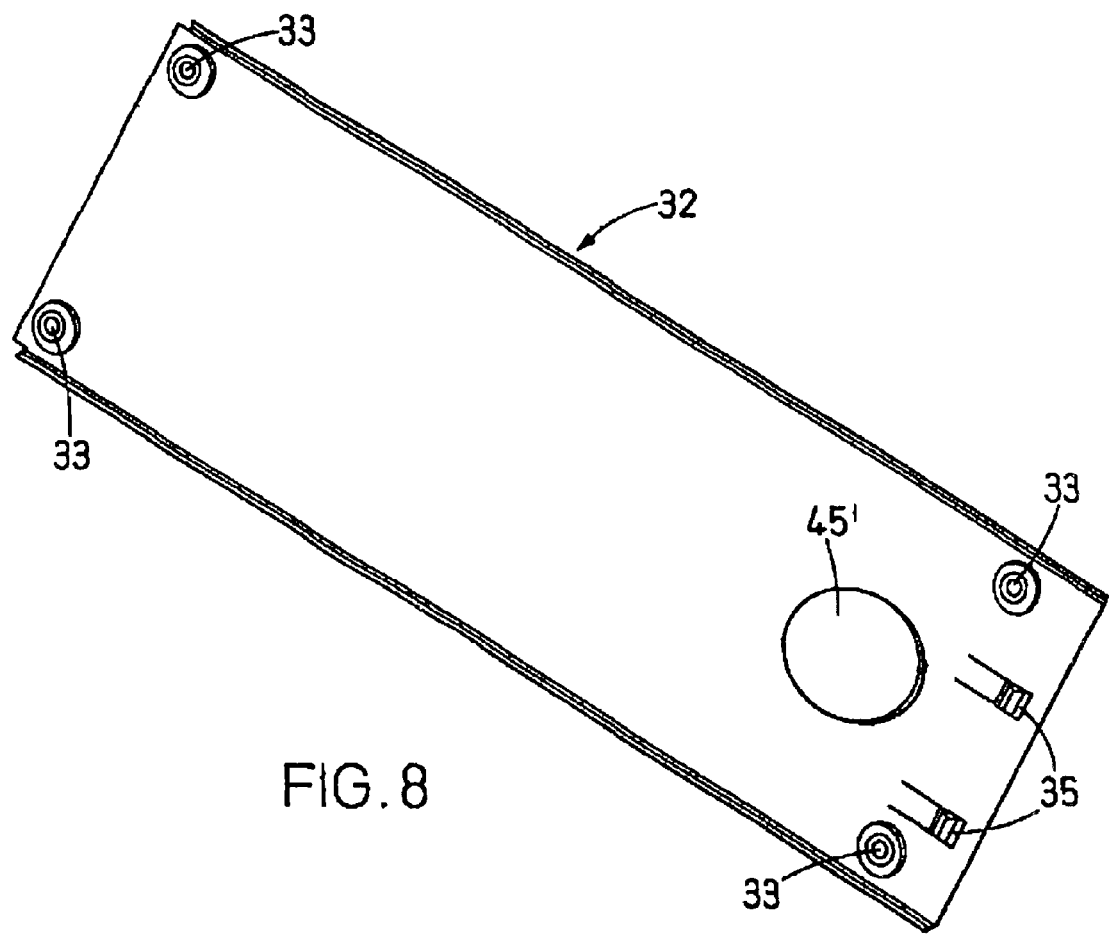
FIG. 8 illustrates a bottom plate to close off the cable corridor.

Another design possibility for the connection of a display/operating unit with an intermediate member 10 is shown in FIG. 3 in a three-dimensional view. A connector wedge 40 is connected to the intermediate member 10 in the same manner as was described for the wedge-shaped base in the context of FIG. 2. Arranged on the topside of the connector wedge 40 are elongated holes or sockets 42 that may serve for the direct mechanical attachment as well as for the electrical connection between the connector wedge 40 and the upper part of the display/operating unit. As an alternative, it is conceivable to arrange an emitter/receiver unit 43 on the connector wedge 40, through which electronic signals are exchanged with a display/operating unit that may be placed farther away, possibly configured as a hand-held unit and likewise equipped with an emitter/receiver unit.

Figure 4:
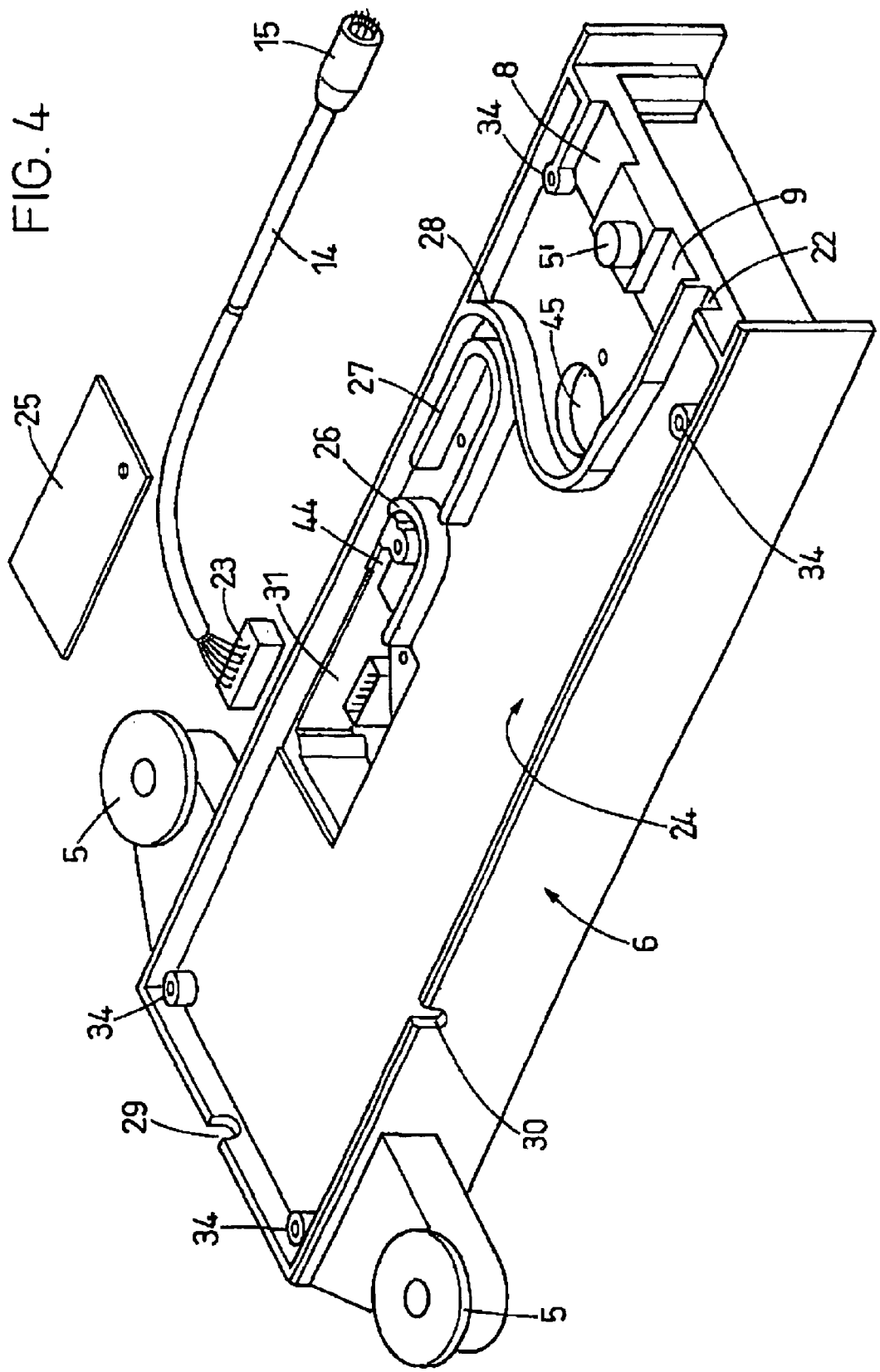
FIG. 4 gives a perspective view of a cable corridor formed in the bottom space of the balance with the plug pulled out of the socket connector of the electronic module.

FIG. 4 gives a perspective view from below into the cable corridor 24 formed in the bottom compartment 6 of the balance and also shows a cable 14 unplugged from the connector socket of the electronic module. As a protection against dust, the access opening 31 to the weighing cell electronics can be closed with a cover 25. The cable 14 enters through the groove 44 into the corridor 24. Arranged along the corridor are different curved guide walls 26, 27, 28, each of a special shape, for example hook-shaped, U-shaped, or S-shaped. The purpose of the guide walls 26, 27, 28 is to guide the cable 14 which is freely movable along the corridor 24, so that when the cable is pulled out of or pushed into the corridor 24, different portions of the cable will not be in contact with each other, which could cause the cable to become stuck due to an excessive amount of friction, so that it could be neither pulled out nor pushed back into the corridor compartment. The guide walls further prevent the cable 14 from buckling. The curved guide walls 26, 27, 28 are arranged in such a manner that they allow a highly flexible arrangement of the cable 14 in regard to the exit location of the cable from the corridor 24 either through the exit opening 22 at the front side, the exit opening 29 at the backside, or the exit opening 30 at a lateral location of the cable corridor. The hole 45 in the bottom serves for the passage of a force-transmitting link for weighing procedures where the sample is suspended below the balance.

Figure 5:
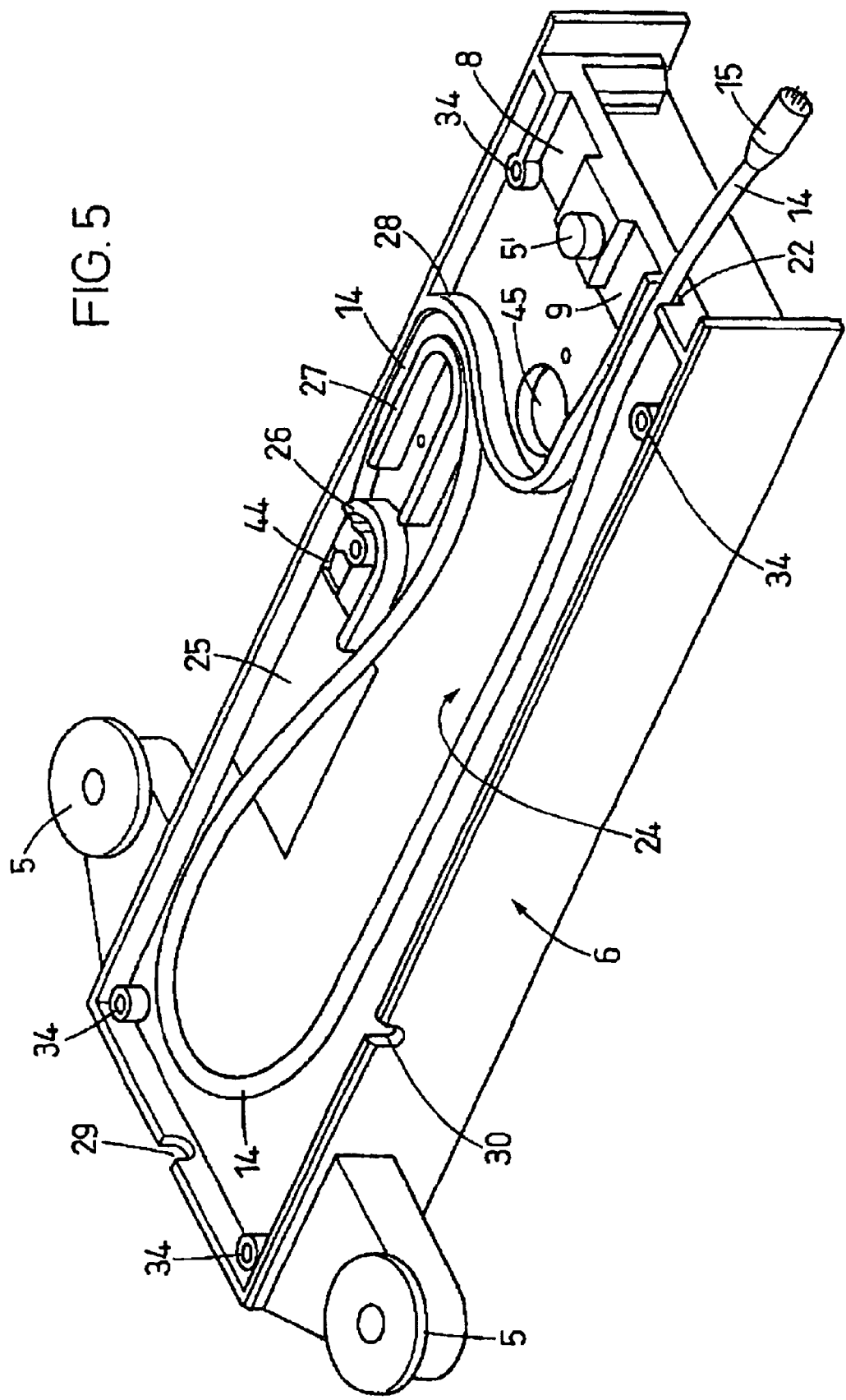
FIG. 5 represents a perspective view into a cable corridor that is formed in a bottom space of the balance, with the cable routed through the exit opening at the front.
Figure 6:
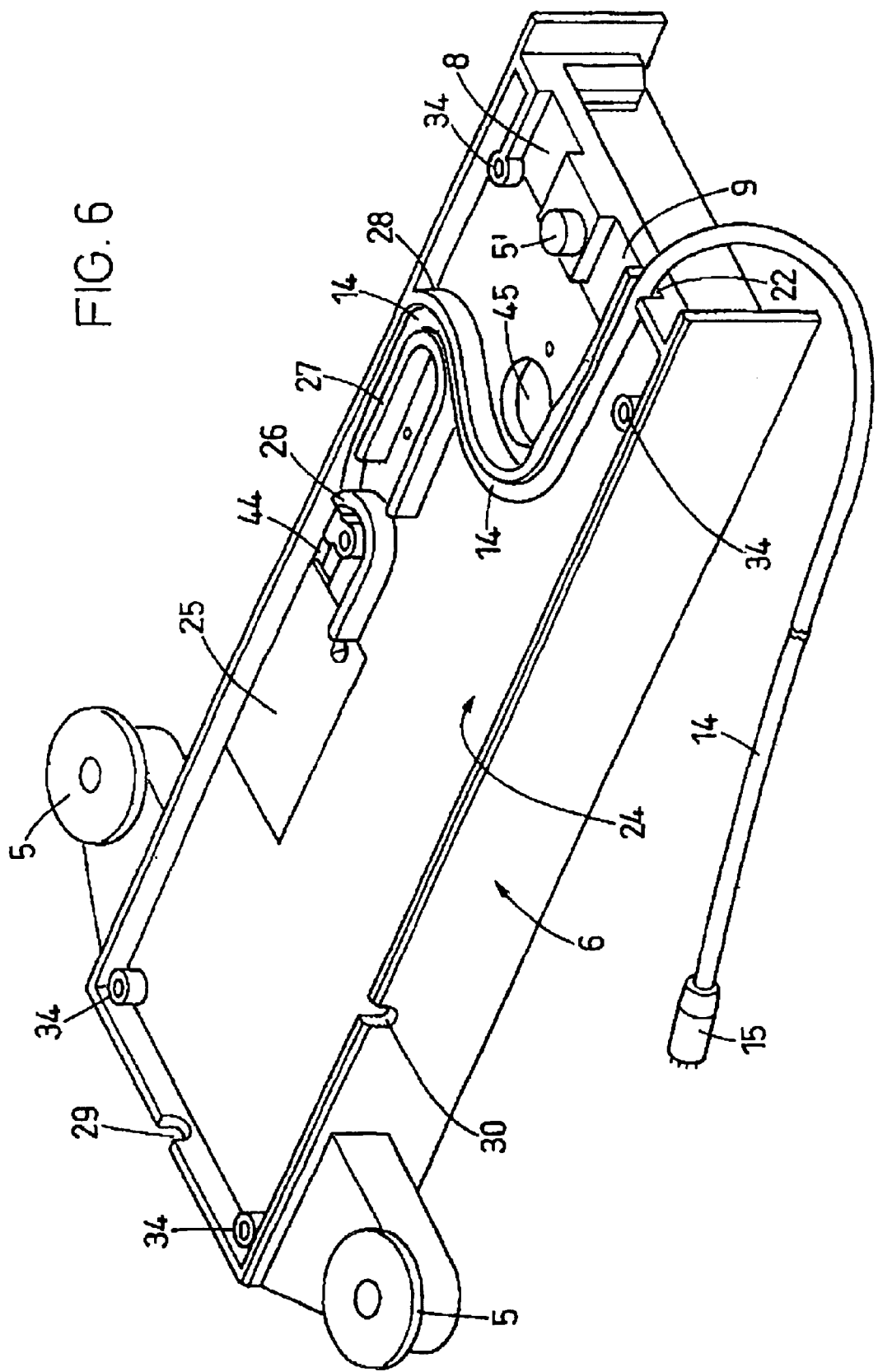
FIG. 6 represents a perspective view into a cable corridor that is formed in a bottom space of the balance, with the cable pulled all the way out through the exit opening at the front.
Figure 7:
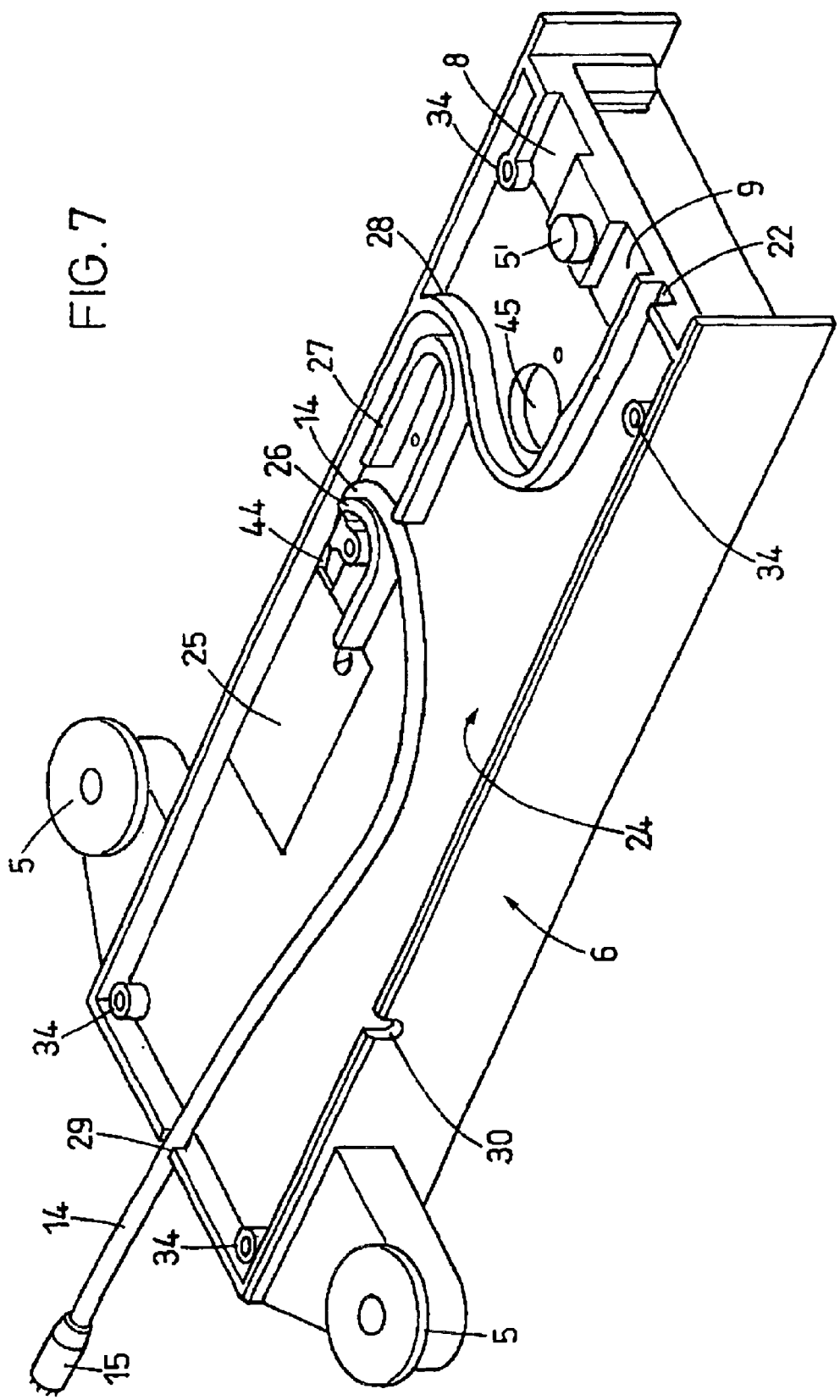
FIG. 7 represents a perspective view into a cable corridor that is formed in a bottom space of the balance, with the cable routed through the exit opening to the rear.

FIG. 5 represents a perspective view from below into the bottom compartment 6 with most of the cable 14 pushed back into the cable corridor 24 and exiting at the frontal opening 22. FIG. 6, in an otherwise identical view, shows the cable 14 mostly pulled out of the frontal opening 22, while FIG. 7, in an analogous view, shows the cable 14 exiting at the rearward opening 29 and partly pulled out. The three figures illustrate the flexibility in the arrangement of the cable 14 inside the corridor 24 by means of the curved guide walls 26, 27, 28. As a result, there is a high degree of freedom in the placement of the display/operating unit 13 in relation to the housing 1. The display/operating unit 13 can be placed directly at the housing 1 as well as in a remote position in front, to the side, or in back of the housing 1, with a choice of cable exits 22, 29, 30 available for the remote positions. The cable 14 is in each case pulled out of the cable corridor 24 to the required length. The display/operating unit 13 can be repositioned with one hand by either pulling the cable 14 out of the corridor 24 if the display/operating unit is moved farther away from the housing 1 or, if the distance is reduced, by pushing the cable 14 into the exit 22, 29, 30 so that it glides back into the cable corridor 24. If the display/operating unit is to be coupled or uncoupled from the housing, the flexible arrangement of the cable 14 proves to be an advantage in that the cable becomes easy to handle by simply pulling a short cable length out of the cable corridor 24.

The flexible concept for placing the display/operating unit 13 has the particular advantage, that the display/operating unit 13 can at any time be disconnected and exchanged by another display/operating unit by simply unplugging the cable 14 by means of the connector plug 15. This also simplifies the cleaning of the work surface under the display/operating unit 13.

The cable corridor 24 can be closed off at the underside with a bottom plate 32, which is preferably fastened by four screws extending through the holes 33 into the internally threaded posts 34 (see FIGS. 4 to 7). The bottom plate 32 has two detent springs 35 that snap into recesses 36 in the flat prongs 11, 12 (see FIGS. 1 and 3) to hold the intermediate member 10 in place. This secure attachment of the intermediate member 10 allows the balance to be lifted off the work table together with the display/operating unit 13 that is positioned on the intermediate member 10, for example by means of a grip handle on the balance as described in EP 1 195 585 B1. As another possibility, the display/operating unit 13 can also be moved together with the intermediate member 10 in order to relocate both to a different place. As a third possibility for handling the balance, a user could also leave the intermediate member 10 plugged into the balance housing 1 and remove only the display/operating unit 13.

The flat portion 21 of the intermediate member 10 can also be used to carry printed or graphic information, for example a short version of the operating instructions or an instruction for performing a certain frequently used weighing procedure. This could also be realized through a folded leaflet connected to the flat portion 21. In order to read the information, the user of the balance only needs to take the display/operating unit 13 off the intermediate member 10.

The cable corridor 24 can also hold two or more cables 14, which are routed to different exits 22, 29, 30. The different cables can be used as alternative connections, or there could also be two of the display/operating units 13 or connector wedges 40 connected simultaneously to the balance. It is also conceivable to connect one of the cables 14 directly to a computer.

| List of Reference Symbols | |
|---|---|
| 1 | housing, balance housing |
| 2 | rear portion of the housing |
| 3 | weighing compartment |
| 4 | weighing pan |
| 5, 5' | feet |
| 6 | bottom, bottom compartment |
| 7 | front side |
| 8, 9 | openings |
| 10 | intermediate member |
| 11, 12 | prong |
| 13 | display/operating unit |
| 14 | cable |
| 15 | cable plug |
| 16 | topside |
| 17 | operating keys |
| 18 | display field |
| 19 | base |
| 20 | clear space |
| 21 | flat portion |
| 22 | frontal exit opening |
| 23 | connector plug |
| 24 | corridor |
| 25 | cover |
| 26 | curved guide wall, hook-shaped |
| 27 | curved guide wall, U-shaped |
| 28 | curved guide wall, S-shaped |
| 29 | rearward exit opening |
| 30 | lateral exit opening |
| 31 | access opening to the electronics |
| 32 | bottom cover plate |
| 33 | holes |
| 34 | internally threaded posts |
| 35 | detent springs |
| 36 | recess |
| 37 | hinge |
| 38 | groove |
| 39 | detent mechanism |
| 40 | connector wedge |
| 41 | feet of the display/operating unit |
| 42 | elongated holes or sockets |
| 43 | emitter/receiver unit |
| 44 | groove |
| 45, 45' | hole |

What is claimed is:

1. A balance comprising a housing (1) with a bottom (6), at least one display/operating unit (13), at least one cable (14) connecting the at least one display/operating unit (13) to the balance, a corridor compartment (24) arranged at the bottom (6) for storing an unused length of the at least one cable (14), and at least one exit opening (22, 29, 30) from the corridor compartment (24) for the cable (14) to pass through, wherein the at least one display/operating unit (13) can be placed adjacent to the housing (1) as well as at a distance from the housing (1), and wherein the corridor compartment (24) has a height that is sufficiently small that the cable (14) is freely movable only horizontally inside the corridor compartment (24) so that a required length of cable can be pulled out of the corridor compartment (24) or an unused length of cable can be pushed into the corridor compartment (24).

2. The balance of claim 1, wherein the corridor compartment (24) is integrated in the bottom (6).

3. The balance of claim 1, further comprising guide elements (26, 27, 28) arranged in the corridor compartment (24) to guide the cable (14).

4. The balance of claim 3, wherein the guide elements (26, 27, 28) are configured as guide walls that are integrated in the corridor compartment (24).

5. The balance of claim 4, wherein said guide walls are curved and have shapes selected from the group consisting of hook shapes, U-shapes, and S-shapes.

6. The balance of claim 1, further comprising a weighing-related electronic circuit and a cable plug (23) on the cable (14) to connect the cable (14) to said weighing-related electronic circuit inside the balance.

7. The balance of claim 1, wherein the display/operating unit (13) is connectable to the housing (1).

8. The balance of claim 1, further comprising an intermediate member (10), which holds the display/operating unit (13) in place on the housing (1).

9. The balance of claim 8, wherein the intermediate member (10) is configured to be plugged into at least one of the housing (1) and the display/operating unit (13).

10. The balance of claim 8, wherein the intermediate member (10) comprises a flat portion (21) that is usable to carry information.

11. The balance of claim 8, further comprising a first emitter/receiver unit (43) arranged on the intermediate member (10) and a second emitter/receiver unit arranged in the display/operating unit (13), 60 that electronic signals can be transmitted between the first and second emitter/receiver units.

12. The balance of claim 1, (wherein the at least one exit opening (22, 29, 30) comprises on each of at least two different sides of the corridor compartment (24) at least one exit opening (22, 29, 30) for the at least one cable (14).

13. The balance of claim 1, wherein the at least one cable (14) comprises a plurality of cables and the at least one exit opening (22, 29, 30) comprises a plurality of exit openings, and wherein the corridor compartment (24) is configured to accommodate said cables so that each can be pulled out or pushed in through a different one of said exit openings.

14. The balance of claim 1, wherein the corridor compartment (24) has an underside covered by a bottom plate (32).

15. The balance of claim 1, wherein the at least one cable (14) comprises a cable plug (15) at a cable end that is connectable to the display/operating unit (13), and wherein the display/operating unit (13) comprises a plug-in socket for the cable plug (15).

16. The balance of claim 1, wherein the display/operating unit (13) can be set at an adjustable tilt angle.

17. The balance of claim 1, wherein the at least one display/operating unit (13) comprises a plurality of display/operating units that can be connected to the balance simultaneously.

18. The balance of claim 2, further comprising guide elements (26, 27, 28) being configured as guide walls that are integrated in the corridor compartment (24) to guide the cable (14).

19. The balance of claim 2, further comprising an intermediate member (10), which holds the display/operating unit (13) in place on the housing (1).

20. The balance of claim 19, wherein the intermediate member (10) is configured to be plugged into at least one of the housing (1) and the display/operating unit (13).

* * * * *